March 9, 1954 — W. SCHMIEDESKAMP — 2,671,434
VALVE MECHANISM FOR GAS EXPANSION ENGINES
Filed April 17, 1951
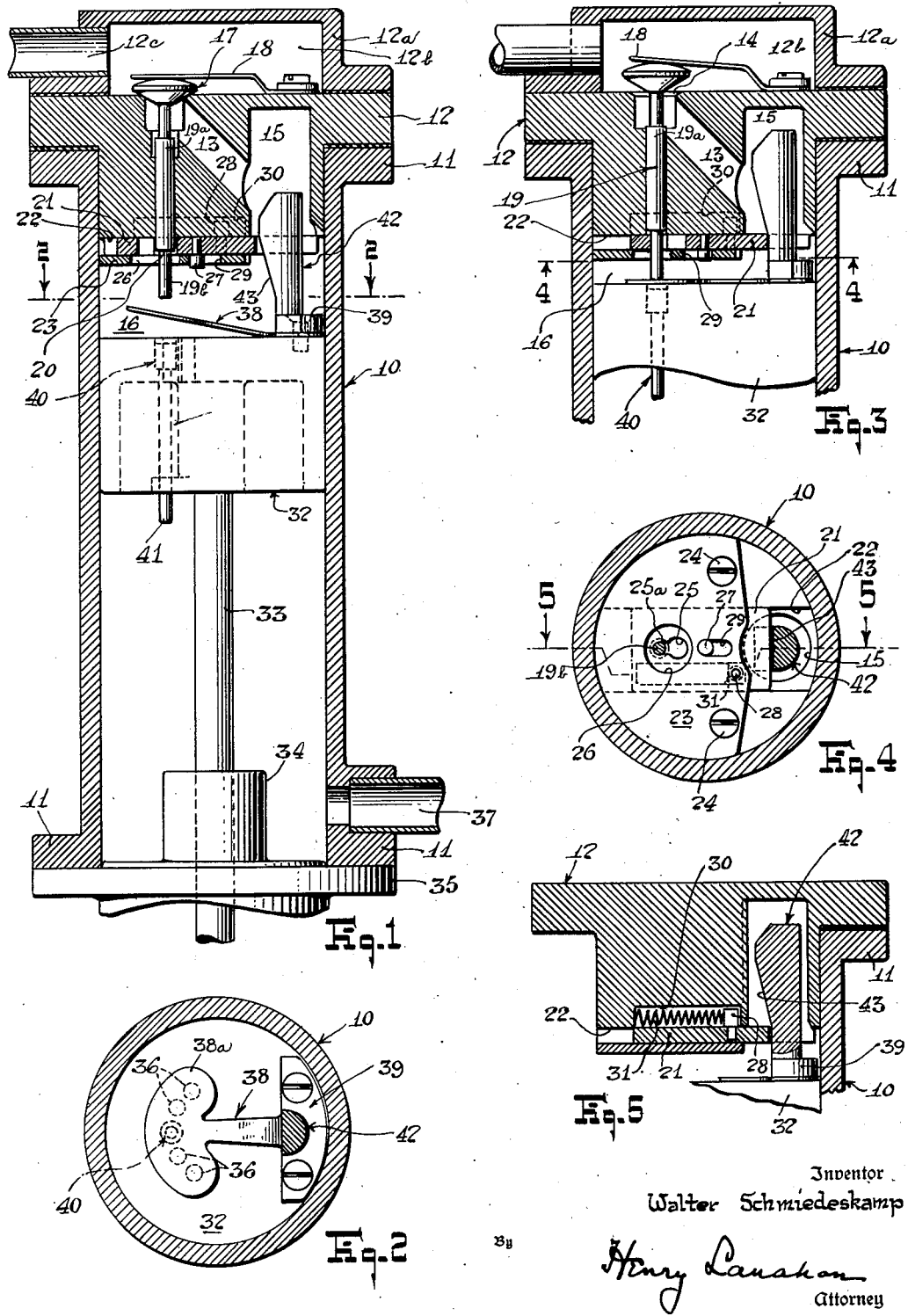
Inventor
Walter Schmiedeskamp
By Henry Lanahan
Attorney Patented Mar. 9, 1954

2,671,434

UNITED STATES PATENT OFFICE 2,671,434

VALVE MECHANISM FOR GAS EXPANSION ENGINES

Walter Schmiedeskamp, Livingston, N. J., assignor to Thomas A. Edison, Incorporated, West Orange, N. J., a corporation of New Jersey Application April 17, 1951, Serial No. 221,487

6 Claims. (Cl. 121—164)

This invention relates to an improved valve-operating mechanism for reciprocating gas engines of the expansion-chamber type, and especially the invention relates to such expansion engines as are used in machines for producing oxygen from the atmosphere.

In oxygen-generating machines of the type mentioned, the air is compressed and cooled to a very cold temperature of the order of −155° C. and is then passed through a gas expansion engine to extract energy from the gas as it is expanded to atmospheric pressure. In portable oxygen-generating plants it is important that the expansion engine be small and efficient in operation. My invention resides in a simple and inexpensive valve-operating mechanism for such engines which is mechanically positive in operation and compact in design to enable an expansion engine to be built which is efficient in operation and small in size.

Some features of the valve-operating mechanisms herein shown are not claimed herein since the same are claimed in the pending application of Frederick G. Kelly, Serial No. 219,210, filed April 4, 1951, now Patent 2,649,078 and having common ownership with the present application.

As will appear, the present invention resides in controlling the intake valve of a gas expansion engine by mechanically-positive means wholly enclosed in the engine cylinder. This means comprises a stem on the valve actuated by the piston at the end of its return stroke to open the valve, means for latching the valve in open position, and means operated directly by the piston in its forward stroke for releasing the latching means when the piston has moved a predetermined distance from the cylinder valve head. Since this mechanism is actuated positively by mechanical means, the present gas engine will operate dependably in any desired position under a wide range of gas inlet and exhaust pressures.

Other objects and features of my invention will be apparent from the following description and the appended claims.

In the description of my invention reference is had to the accompanying drawings, of which:

Figure 1 is a cross-sectional view of an engine cylinder, piston and valve arrangement according to my invention, taken through the axis of the cylinder and showing the parts in the positions they occupy as the piston nears the end of its return (exhaust) stroke;

Figure 2 is a section taken on the line 2—2 of Figure 1;

Figure 3 is a partial sectional view similar to Figure 1 but showing the parts in the positions which they occupy when the piston is at the end of its return stroke;

Figure 4 is a section taken on the line 4—4 of Figure 3; and

Figure 5 is a section taken substantially on the line 5—5 of Figure 4.

In the drawings, there is shown fractionally a gas expansion engine according to my invention having a cylinder 10 provided with exterior rim flanges 11 at the ends. Mounted on the upper rim flange and fitting internally the upper portion of the cylinder is a valve head 12 having therein an intake port 13 provided at the top with a valve seat 14. The port 13 leads obliquely into a well 15 in the valve head open at the bottom of the cylinder chamber 16. Mounted on the top of the valve head 12 is a cap 12a which forms a chamber 12b with the head. This chamber has a gas inlet 12c which is to be connected by suitable tubing to a source of compressed gas (not shown).

The port 13 is closable by means of a poppet valve 17 which is biased closed against the seat 14 by a cantilever spring 18. This poppet valve has a stem 19 extending slidably through the head into the cylinder chamber. The stem comprises upper and lower portions 19a and 19b of which the lower portion is reduced in diameter to form a shoulder 20 near the bottom of the valve head 12. A transverse plate-like latching slide is mounted in a groove 22 formed in the bottom of the valve head, and is held in place by a retaining plate 23 which is secured to the bottom face of the valve head by screws 24 (Figure 4). In the slide 21 and plate 23 there are respective circular clearance openings 25 and 26 for the stem portion 19a of the valve. Also in the slide there is a slot 25a leading lengthwise of the slide from the opening 25. This slot has a width sufficient only to receive the reduced-diameter stem portion 19b. When the intake valve is closed, the stem portion 19a extends into the opening 25. As the intake valve is opened, the stem portion 19a is moved out of the opening 25 to place the shoulder above the slide. The slide can now be moved to the right into its effective position wherein the stem portion 19b extends through the slot 25a. When the intake valve is released, the shoulder 20 will abut against the slide, under influence of the spring 18, to retain the valve in open position.

Secured to the latch slide are respective downwardly- and upwardly-extending headed pins 27 and 28. The pin 27 projects into a short slot 29 provided in the retaining plate 23 and serves by abutment against the ends of this slot to limit the range of movement of the slide. The pin 28 projects into the rightward portion of a relatively narrow groove 30 (Figure 5) provided in the head lengthwise of the groove 22. Interposed between this pin and the wall at the left end of the groove 30 is a compression spring 31 which urges the latching slide to the right into its effective position shown in Figures 3 and 4.

Slidably fitting the cylinder 10 is a piston 32. This piston has a piston rod 33 which extends slidably beyond the lower end of the cylinder through a bearing 34. The bearing 34 is part of a cylinder head 35 secured to the bottom flange 11 of the cylinder. The piston rod is connected by a connecting rod to a crank shaft and the crank shaft is in turn connected to a suitable constant-speed power-consuming device, but this apparatus need not be herein shown.

Leading through the piston is a series of exhaust ports 36 (Figure 2) to allow exhaust of the expanded gas from the chamber 16 as during the return stroke of the piston. This exhaust gas passes from the cylinder via an outlet port 37 at the lower end of the cylinder. An exhaust valve 38 is mounted on the piston for closing the ports 36 during the forward stroke of the piston. This exhaust valve is, for example, in the form of a simple cantilever spring which is secured at one end, as at 39, to the top wall of the piston and which has a lobe 38a at the other end overlying the exhaust ports. The bottom face of this lobe and the confronting face of the piston are ground smooth and flat so that when the valve is pressed downwardly against the piston it will close the exhaust ports without leakage.

The exhaust valve is biased upwardly away from the piston into a normal "open" position shown in Figure 1. By way of example, the biasing of the valve may be such that a differential pressure across it of the order of four pounds per square inch or more is required to hold the valve closed.

The force of the inlet gas pressure on the intake valve is of the order of nine pounds when the inlet pressure is one hundred fifty pounds per square inch. The stem 19a of the intake valve projects into the path of the piston in line with the center of the lobe 38a of the exhaust valve. When the piston nears the end of its return stroke the exhaust valve is first impinged against the stem 19a and is closed because the pressure of the intake valve is sufficient to overcome the bias of the exhaust valve. Thereupon, the intake valve is forcibly opened by the piston as the latter moves to the end of its return stroke.

To assure positive opening of the exhaust valve at the end of the forward stroke, a plunger 40 is mounted slidably in the piston below the lobe 38a and is provided with a stem 41 which, as the piston nears (say approaches within $\frac{1}{10}$″ from) the end of its forward stroke, will abut against the bearing 34 and cause the exhaust valve to be raised from the piston into open position. Once the valve is raised from the piston, the pressure is equalized on both sides thereof and the valve responds only to its bias.

Also mounted on the top face of the piston 32 is an upstanding cam 42. This cam is positioned to move into and out of the well 15 respectively at the end of the return stroke and during the start of the forward stroke. This cam has an inclined face 43 which clears the slide 21 when the latter is in ineffective position (Figure 1) but which, when the slide is in effective position shown in Figure 3, will engage the right end of the slide and cam it to ineffective position as the piston moves through the initial portion of its forward stroke. The exact point of the piston at which the slide reaches its ineffective position will depend of course on the design of the cam. Typically, the slide is moved to ineffective position to unlatch the intake valve as the piston has moved through about one-fifth of its forward stroke.

The operation of the above-described engine is as follows: During the return stroke of the piston 32 the parts are in the positions which they occupy in Figure 1—i. e., the intake valve is held tightly closed by the gas inlet pressure and the exhaust valve is held open by its normal bias. During the end portion of the return stroke the exhaust valve impinges against the stem 19b and is closed thereby because the pressure on the intake valve is sufficiently great to overpower the bias of the exhaust valve. As soon as the exhaust valve is closed, the piston exerts a positive upward thrust on the poppet valve to lift it into a fully-open position against the force of the spring 18. As the intake valve is so raised, the shoulder 20 clears the latch slide 21, and the latter is then moved to the right under influence of the spring 31, to latch the intake valve in open position, it being noted that this rightward latching movement of the slide 21 is permitted at this point in the stroke because the cam 42 is then out of the path of the slide.

As soon as the intake valve is opened, the air from the high-pressure source rushes into the expansion chamber 16 to exert a downward driving thrust on the piston. As the piston is driven forwardly, the exhaust valve leaves contact with the stem 19b, but is retained in closed position by the high differential pressure then existing across it. Also, as the piston moves through the first portion of its forward stroke, the cam face 43 bears slidably against the right end of the latch slide and cams it to its ineffective position, wherein the stem 19a is aligned with the clearance opening 25, to allow the intake valve to close under the influence of the spring 18. The charge of compressed gas which is captured in the chamber 16 continues to drive the piston forwardly but this forward thrust now occurs by expansion of the gas. As the piston is driven forwardly, an increasing differential force develops across the intake valve to hold it tightly closed. Since the piston is connected to a power-consuming device aforementioned but not herein necessary to show, the expanding gas does work at the expense of its stock of internal energy, with the result that the temperature of the gas is lowered much more than it would be by expansion alone through a nozzle.

At the end of the forward stroke, the exhaust valve is opened, either in response to the fall of differential pressure thereacross or by impingement of the stem of the plunger 40 against the abutment 34, to allow immediate release of any remaining pressure in the expansion chamber. During the return stroke the exhaust valve remains open to allow residual gas in the expansion chamber to escape via the exhaust ports 36 and the outlet opening 37. This return of the piston will be effected by the drive connection to the constant-speed means aforementioned to which the piston is connected.

Typical values for a gas expansion engine suitable for a small oxygen-generating plant may be as follows: the piston may have a stroke of the order of 2¼", the exhaust valve may be closed when the piston is 3/16" from the valve head 12, the intake valve may be fully open when the piston is 1/16" from the head 12, and the intake valve may be closed when the piston has been driven forwardly through approximately 20% of its stroke. These values are however only illustrative and no unnecessary limitation thereto is intended.

The embodiment of my invention herein described is intended to be illustrative and not necessarily limitative of my invention, since the same is subject to changes and modifications without departure from the scope of my invention, which I express according to the following claims.

I claim:

1. A gas expansion engine comprising a cylinder having a head at one end provided with an intake port, a piston movable in said cylinder, a valve for said intake port, operable means for latching said intake valve in open position, means for rendering said latching means effective as said intake valve reaches open position, a cam element connected to said latching means and exposed in said cylinder, and a cooperating cam element mounted on said piston and effective in the initial receding movement thereof away from said head for releasing said latching means.

2. A gas expansion engine comprising a cylinder having a head at one end provided with an intake port, a piston movable in said cylinder, a valve for said intake port, means operable by said piston to open said intake valve as the piston nears said head, means responsive to the opening of said intake valve for latching the same in open position, and means carried by said piston and operative in the first portion of the receding movement of the piston away from said head for releasing said latching means.

3. A gas expansion engine comprising a cylinder having a head at one end provided with an intake port, a piston movable in said cylinder, a poppet valve for said intake port movable in the direction away from the piston into open position and held normally closed by the inlet gas pressure, a stem on said valve projecting into said cylinder into the path of the piston for causing the valve to be opened by the piston as the piston nears the end of its return stroke, and a latch member slidably mounted on said head and cooperable with said stem for latching said valve in open position.

4. A gas expansion engine comprising a cylinder having a head at one end provided with an intake port, a piston movable in said cylinder, a poppet valve for said intake port movable in the direction away from the piston into open position, means biasing said valve closed, a stem on said poppet valve, a latching slide on said head biased for locking engagement with said stem when said valve is in open position, and a cam member mounted on said piston in position to engage said slide and cam it out of locking engagement with said stem as said piston recedes from said head.

5. A gas expansion engine comprising a cylinder having a head at one end provided with an intake port, said head having also a well therein open to the cylinder chamber, a piston movable in said cylinder chamber, a poppet valve for said intake port biased into closed position and having a stem slidably mounted in said head and projecting into said cylinder chamber, a transverse slide on said head projecting into said well and movable crosswise of the cylinder into locking engagement with said stem wherefore to latch said valve in open position, means urging said slide into latching position, and a cam member mounted on and extending from said piston for movement into and out of said well respectively as the piston nears said head and moves therefrom, said slide being adapted to project into the path of said cam member when the slide is in effective position, and said cam member being adapted to engage slidably the latching slide to move it to ineffective position as said piston recedes from said head.

6. A gas expansion engine comprising a cylinder having a head at one end provided with an intake port, a piston movable in said cylinder, a poppet valve for said intake port, spring means biasing said poppet valve towards said piston into closed position, a stem on said valve operable by said piston as the latter reaches the end of its return stroke to move said valve into open position, a transversely-movable member cooperable with said stem to latch said valve in open position, spring means biasing said latching member to move it into effective position when said valve reaches open position, and means on said piston engageable with said latching member as said piston recedes from said head to move the latching member into ineffective position.

WALTER SCHMIEDESKAMP.

References Cited in the file of this patent

UNITED STATES PATENTS

| Number | Name | Date |
|---|---|---|
| 342,073 | Curtis | May 18, 1886 |
| 368,648 | Carpenter | Aug. 23, 1887 |
| 669,290 | Stoer | Mar. 5, 1901 |
| 1,506,929 | Harrison | Sept. 2, 1924 |